E. SCHNEIDER.
TWO-AXLED VEHICLE FOR TRANSPORTING HEAVY GUN BARRELS, AND IN THE ADAPTATION OF GUNS FOR THE USE OF SUCH VEHICLE.
APPLICATION FILED JAN. 4, 1922.

1,429,540.

Patented Sept. 19, 1922.
10 SHEETS—SHEET 1.

E. SCHNEIDER.
TWO-AXLED VEHICLE FOR TRANSPORTING HEAVY GUN BARRELS, AND IN THE ADAPTATION OF GUNS FOR THE USE OF SUCH VEHICLE.
APPLICATION FILED JAN. 4, 1922.
1,429,540.
Patented Sept. 19, 1922.
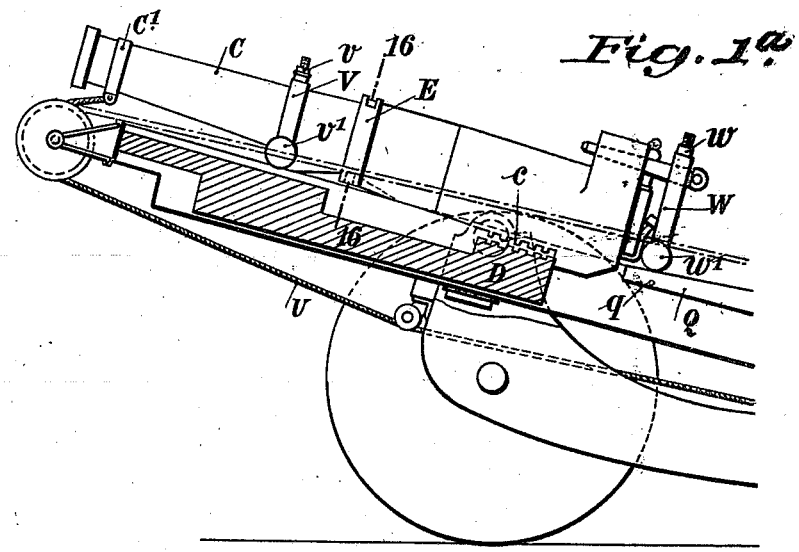
Fig. 1ª
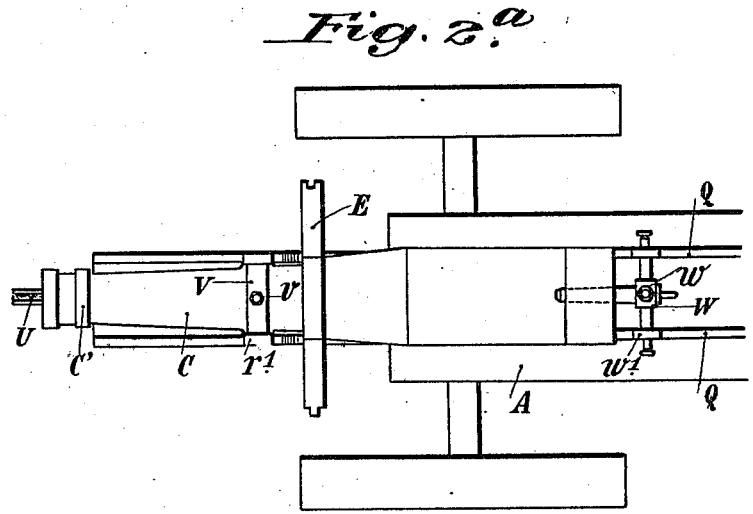
Fig. 2ª
Inventor:
Eugene Schneider
By Mauro, Cameron, Lewis & Kirkam
Attorneys.

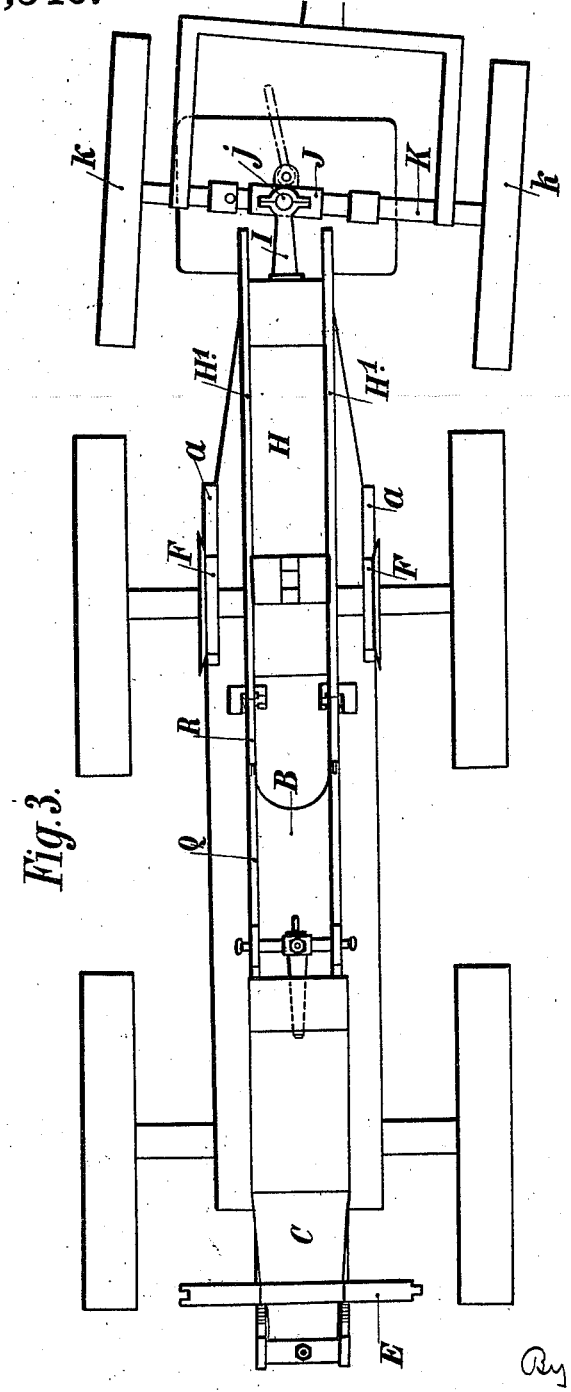

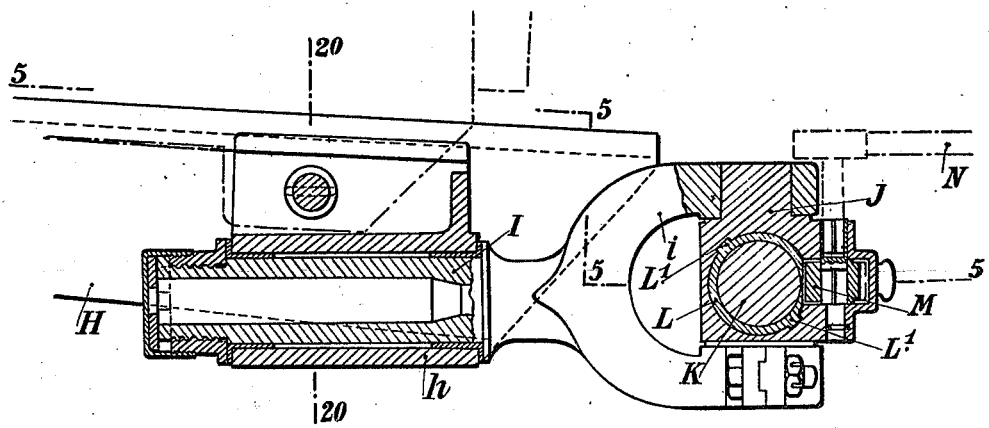
Fig. 4.
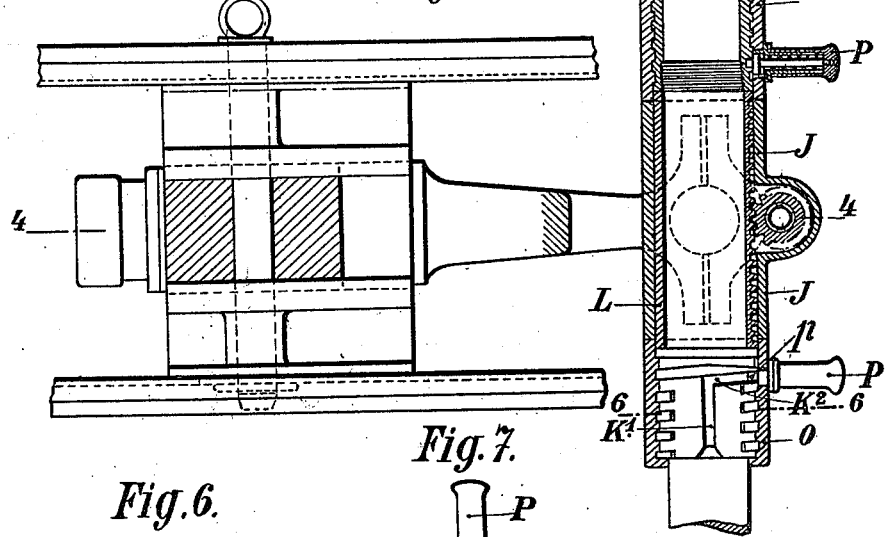
Fig. 5.
Fig. 6. Fig. 7.
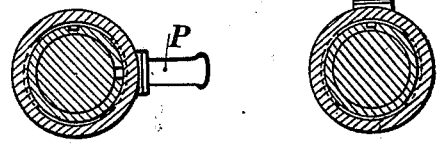

E. SCHNEIDER.
TWO-AXLED VEHICLE FOR TRANSPORTING HEAVY GUN BARRELS, AND IN THE ADAPTATION OF GUNS FOR THE USE OF SUCH VEHICLE.
APPLICATION FILED JAN. 4, 1922.

1,429,540.

Patented Sept. 19, 1922.
10 SHEETS—SHEET 5.

Inventor:-
Eugene Schneider
By Mauro, Cameron, Lewis & Kerkam
Attorneys

E. SCHNEIDER.
TWO-AXLED VEHICLE FOR TRANSPORTING HEAVY GUN BARRELS, AND IN THE ADAPTATION OF GUNS FOR THE USE OF SUCH VEHICLE.
APPLICATION FILED JAN. 4, 1922.

1,429,540.

Patented Sept. 19, 1922.
10 SHEETS—SHEET 7.

Inventor:—
Eugene Schneider
By Mauro, Cameron, Lewis & Massey
Attorneys

E. SCHNEIDER.
TWO-AXLED VEHICLE FOR TRANSPORTING HEAVY GUN BARRELS, AND IN THE ADAPTATION OF GUNS FOR THE USE OF SUCH VEHICLE.
APPLICATION FILED JAN. 4, 1922.

1,429,540.

Patented Sept. 19, 1922.
10 SHEETS—SHEET 8.

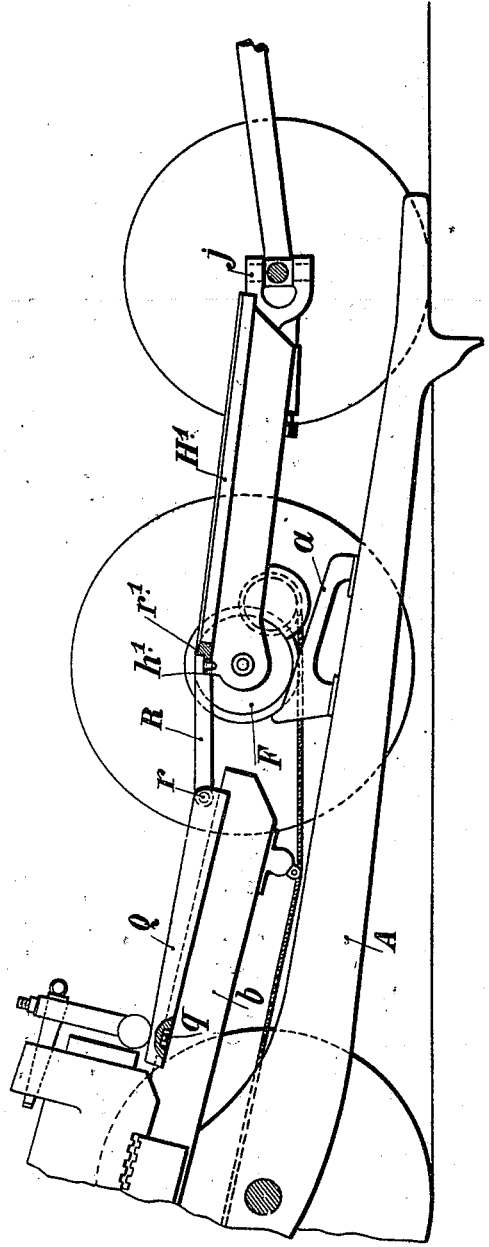

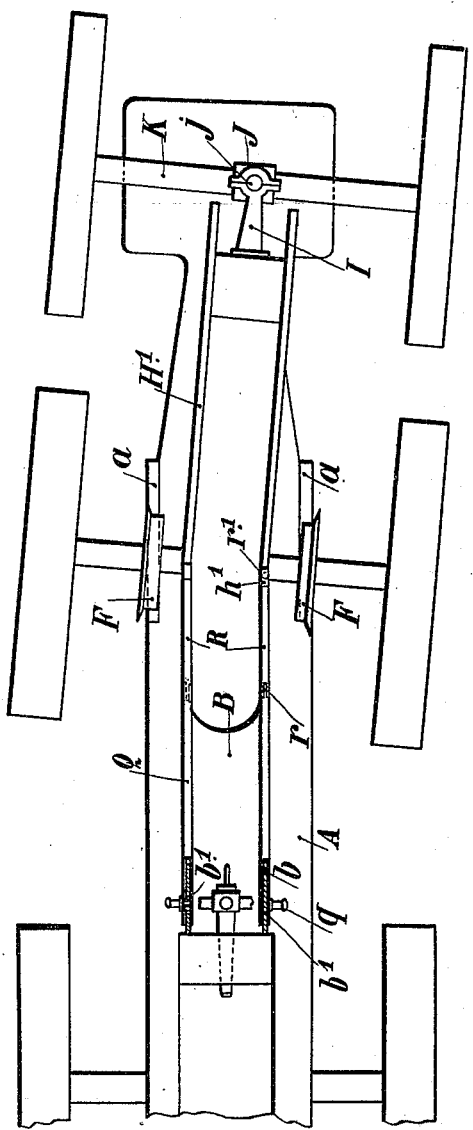

Patented Sept. 19, 1922.

1,429,540

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

TWO-AXLED VEHICLE FOR TRANSPORTING HEAVY GUN BARRELS, AND IN THE ADAPTATION OF GUNS FOR THE USE OF SUCH VEHICLE.

Application filed January 4, 1922. Serial No. 526,986.

*To all whom it may concern:*

Be it known that I, EUGÈNE SCHNEIDER, a citizen of the Republic of France, resident of 42 Rue d'Anjou, Paris, France, have invented new and useful Improvements in Two-Axled Vehicles for Transporting Heavy Gun Barrels, and in the Adaptation of Guns for the Use of Such Vehicles, which is fully set forth in the following specification.

This invention consists in improvements in two-axled vehicles for transporting heavy gun barrels and in the adaptation of guns for the use of such vehicles.

An improved vehicle for transporting heavy gun barrels is so constructed according to this invention as to enable a heavy gun barrel to be transferred from its carriage on to the vehicle and vice versa, after two rollers, provided on the rear axle of the vehicle have been brought to bear upon the gun trail in the usual manner, without it being necessary to raise the two wheels of the front axle of the vehicle off the ground. For this purpose according to the present invention the combination consisting of the vehicle rear carriage and the framing of the vehicle, is connected to the front carriage of the said vehicle by a universal joint. This apparatus is combined with an arrangement of removable rails each composed of two sections hinged together.

According to one constructional form of the invention one of the pivot pins of the universal joint of the vehicle rear carriage axle is carried by a sleeve which is capable of being slidden along the front carriage axle of the vehicle in order that it shall be possible by this sliding movement to rectify the position of the vehicle rear carriage relatively to the vehicle front carriage which has remained fixed, in order that the vehicle framing which moves with the vehicle rear carriage shall be able to come in longitudinal line with the slideways of the gun carriage cradle.

This first constructional form of the invention is illustrated in Figures 1 to 20 of the accompanying drawings in which:—

Complementary Figs. 1 and 1ª are a longitudinal elevation of the general arrangement showing the gun transport vehicle in place at the rear of the gun carriage, ready for the gun to be transferred on to the said vehicle.

Complementary Figs. 2 and 2ª are a plan showing the gun transport vehicle with its rear carriage resting by means of the usual rollers upon the gun carriage trail, but before the vehicle rear carriage and vehicle framing have together been adjusted in position relatively to the vehicle front carriage whose wheels are resting on the ground.

Figure 3 is a similar plan of the general arrangement showing the vehicle rear carriage after it has been adjusted in position and then coupled by means of a special device to the gun carriage cradle for the purpose of the transference of the gun barrel. This view corresponds, as a matter of fact, to the elevation shown in Figure 1.

Figure 4 is a detail partial section on the line 4—4 of Figures 2 and 5.

Figure 5 is a corresponding partial horizontal section on the line 5—5 of Figure 4.

Figure 6 is a section on the line 6—6 of Figure 5.

Figure 7 is a similar section showing the locking device in a different position.

Figure 13:
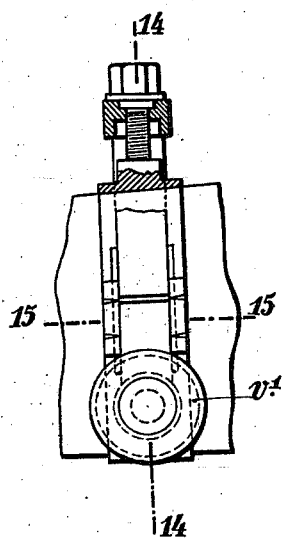
Figure 14:
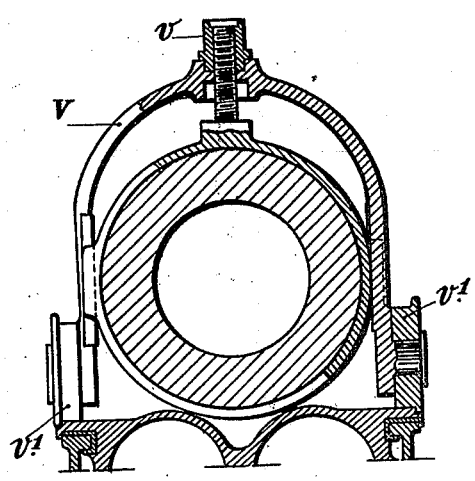
Figure 15:
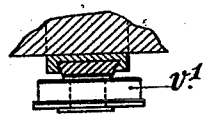

Figures 13, 14 and 15 are respectively a part sectional elevation, and sections on the lines 14—14 and 15—15 of Figure 13 of a detail of the front gun barrel carrier.

Figure 1:
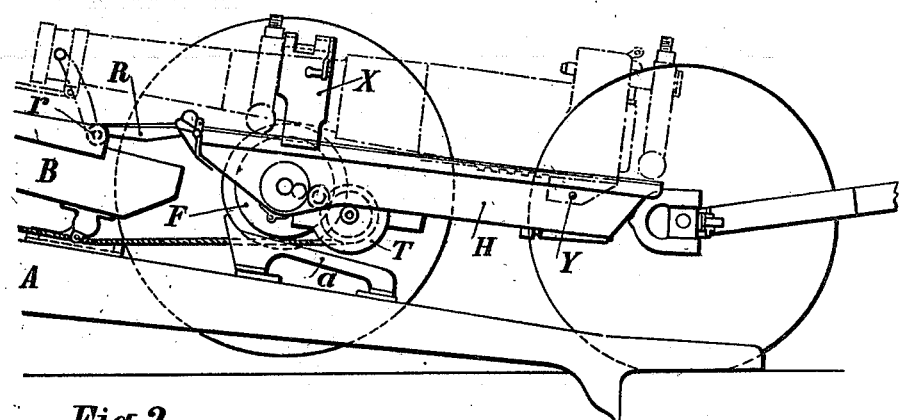
Figure 16:
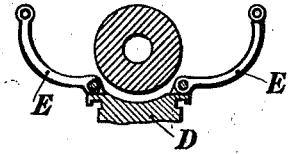

Figure 16 is a section on the line 16—16 of Figure 1, showing the ring for attaching the gun barrel upon the gun carriage slide, opened for the operation of transference.

Figure 17:
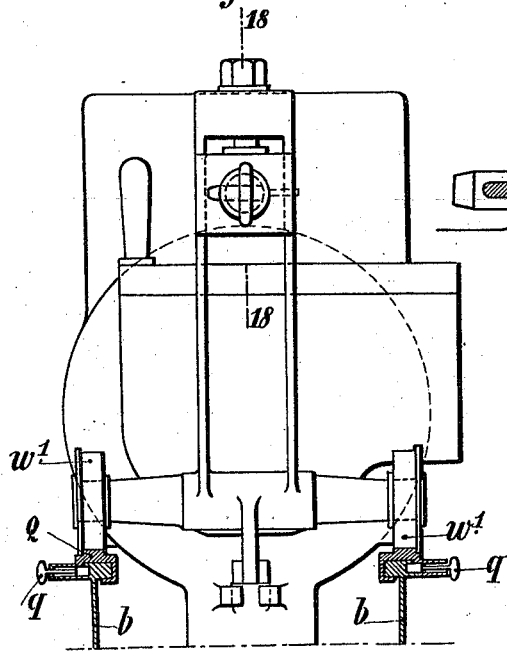

Figure 17 is a rear elevation of the gun barrel showing the removable carrier that serves for lifting the rear part of the gun barrel and carrying it in its rolling movement for transference.

Figure 18:
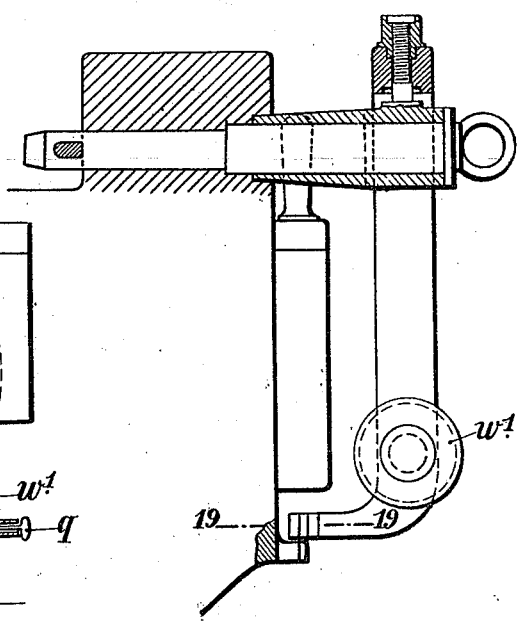

Figure 18 is a section on the line 18—18 of Figure 17.

Figure 19:
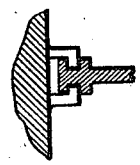

Figure 19 is a horizontal section of the line 19—19 of Figure 18.

Figure 20:
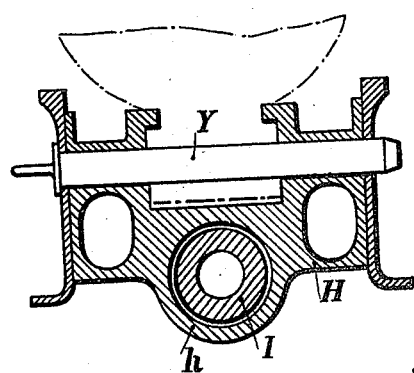

Figure 20 is a section on the line 20—20 of Figure 4, and

Figures 21 and 22 are respectively a longitudinal elevation and a plan illustrating another embodiment of the invention.

Figure 2:
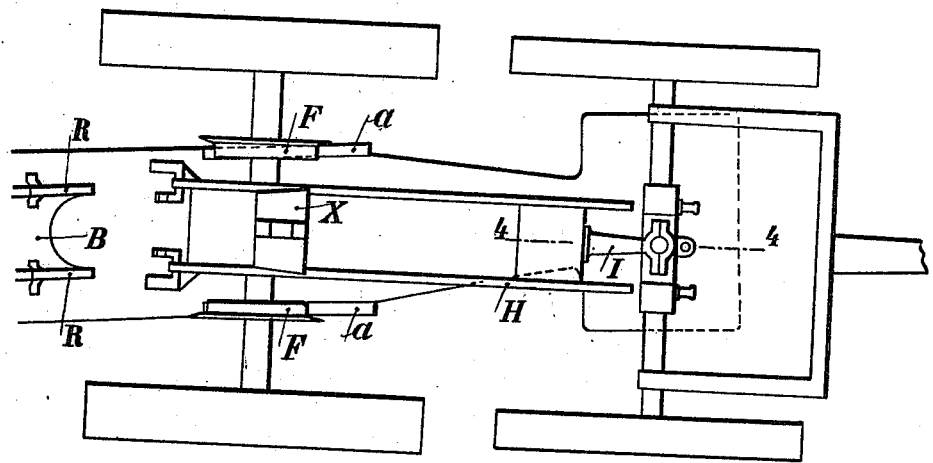

In Figures 1, 2 and 3, A is the trail of a wheeled gun carriage; B is the gun cradle; and C is the gun barrel which is coupled to the gun slide D for firing purposes by means of teeth $c$ in the usual manner, and is further held on to the said slide by the ring E (Figures 1 and 16) made in two pieces connected by a suitable fastening.

The trail comprises as usual two inclined supports $a$ on to which the rollers F provided on the rear carriage of the gun transport vehicle, are brought for the purpose of transporting the gun barrel. G is the rear axle of this vehicle, carrying the rear end of the vehicle framing H.

According to this invention the combination of the vehicle rear carriage $g$—G—$g$ and framing H is adapted by means of a bearing $h$ provided on the front part of the framing to turn on an arm I. This arms is in its turn adapted by means of a fork $i$ to turn on a vertical pivot pin $j$ formed on a sleeve J in which is fitted the axle K of the vehicle front carriage $k$—K—$k$.

It will be at once perceived that by reason of the pivot joint at I, the vehicle front carriage is enabled to assume positions of any desired transverse inclination relatively to the vehicle rear carriage, whereas the pivotation around the vertical axis $j$—$j$ allows the combined vehicle rear carriage and framing to assume as a whole an oblique position in horizontal projection relatively to the front vehicle carriage.

This first constructional example comprises an apparatus which allows the combined vehicle rear carriage and framing to slide as a whole along the axle of the front vehicle carriage for the purpose of adjusting the rollers F into proper position on the supports $a$, and finally bring the framing H into longitudinal line with the gun cradle for the operations of transferring the gun barrel.

As shown in Figures 4 to 8 inclusive the sleeve J is able to slide along ribs L′ of a sheath L in which the axle K can revolve. This sheath is formed with rack-teeth $L^2$ with which a pinion M meshes that is mounted on a shaft $m$ journalled on the sleeve J, and adapted to be operated by means of a removable crank-handle N. Normally all longitudinal shifting of the sleeve J along the sheath L is prevented by two stop caps O screwed on the axle K by means of screw-threaded and plain hit-and-miss sectors. As shown in Figure 5, the two caps O are engaged by means of their interrupted internal screw-threads with the corresponding interrupted screw-threads of the axle K, and are held in this position by spring bolts P that engage by means of their noses $p$ with the transverse portion $K^2$ of an elbow slot $K'$—$K^2$ formed in the said axle.

When, for the purpose of adjusting the position of the vehicle rear carriage it is desired to be able to slide the sleeve J, for instance, towards the top of Figure 5, the gun-server unscrews the cap O that is situated at the top of the Figure, by suitably operating the corresponding bolt P so as to cause it to move from the position shown in Figure 6, to that of Figure 7. In this way the screw threads of the cap O are disengaged by bringing them opposite the corresponding smooth sectors of the axle which allows of shifting the sleeve so as to bring it into the position shown in Figure 8. From this moment it is sufficient to operate the crank-handle N in the desired direction in order to cause the pinion M to roll over the rack $L^2$ until the arm I, moved by the pins $j$ has itself suitably shifted the framing H and consequently also the vehicle rear carriage and the rollers F.

Figure 8:
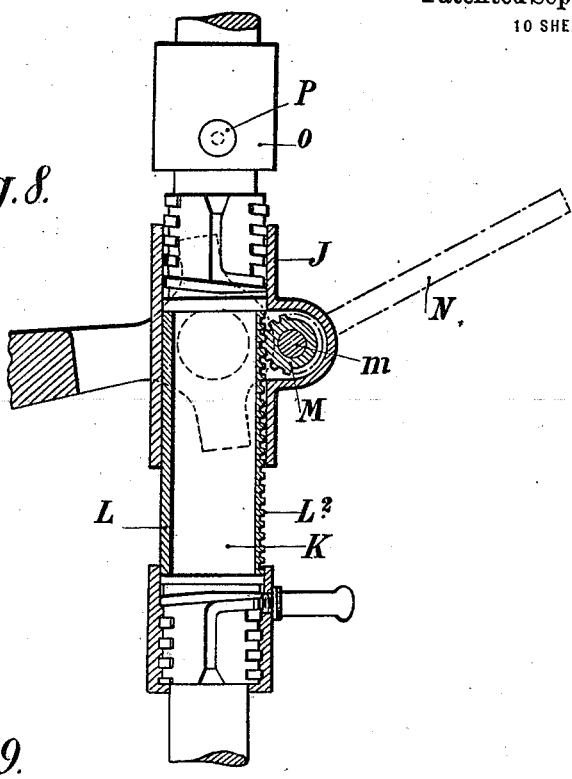
Figure 8 is a partial horizontal section similar to Figure 5 illustrating the operation for adjustment of the position of the rear carriage of the gun transport vehicle.

It is obvious that for transport it is advisable to return the retaining cap O from the position shown in Figure 8 back into the initial position shown in Figure 5.

According to this invention the vehicle rear carriage is combined with an arrangement of removable rails each composed of two sections Q R hinged to each other. The section Q is engaged by means of a pin $q$ in a corresponding notch in the frame plate $b$ of the gun cradle (Figure 17). The rear section R is pivoted at its end $r$ to the other section Q and has its other end $r'$ shaped so as to engage the framing H of the vehicle for the transport of the gun barrel.

Figure 9:
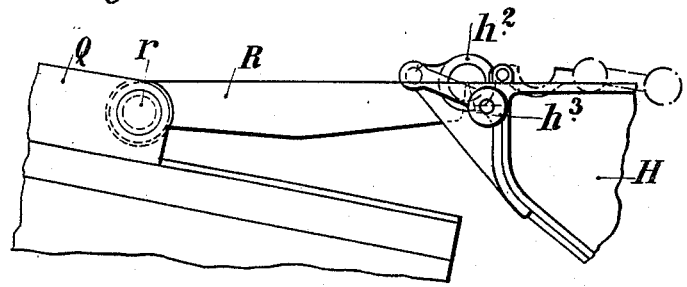
Figure 9 is a partial detail elevation of an arrangement of removable hinged rails adapted to be connected to the adjustable rear carriage of the vehicle, for the purpose of effecting the transference of the gun barrel.
Figure 10:
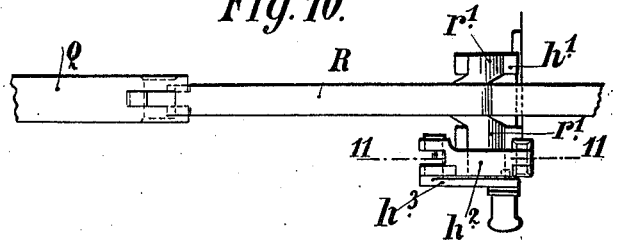
Figure 10 is a corresponding plan.
Figure 11:
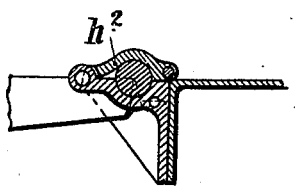
Figure 11 is a section on the line 11—11 of Figure 10.

When it is desired to transfer the gun barrel from its carriage on to the transport vehicle the sections Q are engaged by means of the pins $q$ on the cradle B while the sections R remain folded back on to the sections Q (Figure 2) until the rollers F have been adjusted in position upon their supports $a$. Then only can the sections R be turned back so as to become engaged with the framing H. For the purpose of this engagement the rail section R is provided with two pins $r'$ adapted to engage in half-round steps $h'$ carried by the framing, and then the sections R are locked in place by turning down on to the pins $r'$, a cap $h^2$ (Figures 9 and 11) hinged to the framing and occupying before this turning down movement the position indicated in dot-and-dash lines in Figure 9. To the said cap there is also pivoted an eccentric spindle $h^3$ whereby it can be locked to the framing. The transference of the gun barrel on to the transport vehicle as herein described through the medium of the removable hinge rails is effected by known means.

Figure 12:
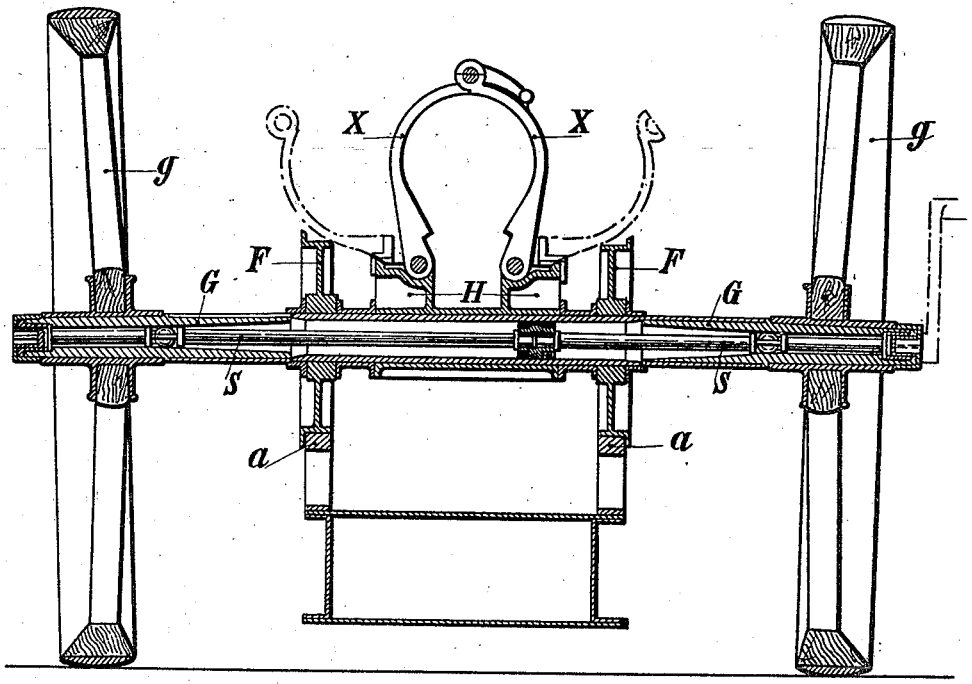
Figure 12 is an axial section of the axle of the rear carriage of the vehicle.

However the invention comprises a peculiarity which consists in the mounting of the driving shaft S of the operating windlass T inside the axle G of the adjustable rear carriage of the vehicle. The operating cable U is attached in the usual manner to a collar C' on the gun barrel. Then the gun barrel is raised by operating the nuts $v$ and $w$ by which the gun barrel is caused to slide in the usual guides of the front carrier V and the rear carrier W respectively. As soon as the gun barrel has been detached from the gun slide the half-rings E having been properly opened out as shown in Figure 16 the cable U is allowed to unwind and thus permit the gun barrel to descend by a rolling movement of the rollers $v'$ and $w'$ on the slideways of the cradle and on the hinged rails Q—R, and thence on the rails H' of the framing of H. When the gun barrel is occupying the position indicated in dot-and-dash lines in Figure 1 two half-rings X hinged to the framing H and which previously occupied the position indicated in dot-and-dash lines in Figure 12 are turned up on to the gun barrel. The gun barrel is further fastened to the framing H by means of a key Y (Figure 20).

Figures 21 and 22 are respectively a longitudinal elevation and a plan of a constructional form wherein the sleeve J carrying the pivot pins $j$ for the arm I is not able to have any longitudinal movement on the axle K of the front carriage of the gun-transport vehicle.

In this construction the arrangement of removable hinged rails Q—R is consequently modified that is to say, each of the sections Q with its locking pin $q$ is allowed a certain amount of longitudinal movement, the pin being engaged in an oblong or buttonhole shaped slot $b'$ in the frame plate $b$. On the other hand the rear section R is provided at its free end with a single stud $r'$ which engages in a recess $h'$ formed in the end of the corresponding rail H'. The latter is situated on a level with the axle of the rear carriage of the gun-transport vehicle, the rails H' being arrested at these points instead of being extended rearwardly as in the foregoing example.

With this construction it is no longer necessary before transferring the gun barrel, to bring the gun-transport vehicle into exact longitudinal line with the slideways of the gun cradle. Owing to the mobility of the pins $q$ and of the rail sections Q it is always possible to ensure the engagement of sections R by means of the studs $r'$ in the notches $h'$ as shown in Figure 22, even when the vehicle is slightly oblique in plan relatively to the gun carriage.

Having now particularly described and ascertained the nature of my said invention and in what manner the same is to be performed, I declare that what I claim is:—

1. A gun-transport vehicle comprising a front carriage, a rear carriage provided with a gun-receiving frame and rollers, a universal connection between said front and rear carriages comprising a sleeve rotatably mounted on the axle of the front carriage and having a substantially vertical pin, a bearing on the gun-receiving frame, and a substantially horizontal arm having one end pivoted on said vertical pin and its opposite end journalled in said bearing, in combination with a gun carriage having a trail receiving said rollers and supporting the transport-vehicle rear carriage in elevated position, and means for transferring a gun from the gun carriage to the transport-vehicle comprising a pair of rail sections hinged together, one of said sections being supported on the gun slide and the other of said sections having its free end connected with the gun-receiving frame.

2. A gun-transport vehicle comprising a front carriage, a rear carriage provided with a gun-receiving frame, connections between said carriages providing for elevation and sliding movement of the rear carriage transversely of the front carriage, said connections comprising a sleeve rotatably mounted on the front carriage axle and movable longitudinally of the same, and an arm connected with the gun-receiving frame and said sleeve, in combination with a gun carriage having a trail on which the transport-vehicle rear carriage is supported in elevated position, and means connected with the gun slide and the gun-receiving frame for transferring the gun from the gun carriage to the transport-vehicle.

3. A gun-transport vehicle comprising a front carriage, a rear carriage provided with a gun-receiving frame, a universal connection between said front and rear carriages, in combination with a gun carriage having a trail on which the transport-vehicle rear carriage is supported in elevated position, and adjustable means for transferring a gun from the gun carriage to the transport-vehicle, said means comprising a pair of rail sections hinged together, one of said sections having pin and slot connections with the frame plates of the gun cradle, the other of said sections being vertically pivoted on the gun-receiving frame.

4. A gun transport vehicle comprising a front carriage, a rear carriage provided with a gun-receiving frame, a universal connection between said front and rear carriages, in combination with a gun carriage having a trail on which the transport-vehicle rear carriage is supported in elevated position, and means for transferring the gun from the gun carriage to the transport vehicle, said means comprising a track having one end connected with the gun cradle and its opposite end connected with the gun-receiving frame, a windlass member rotatably mounted in the axle of said rear carriage, and means connected with the gun and said windlass member for controlling movement of the gun during transfer of the same.

5. In combination, a gun carriage provided with slideways, a gun transport vehicle having a rear carriage supported on the trail of the gun carriage and provided with a gun-receiving frame having slideways, a front carriage in ground engagement, means connecting said front and rear carriages providing for elevation of the latter to its position of support on the gun trail, and means connecting the opposed ends of said slideways for transferring the gun from one carriage to another.

6. In combination, a gun carriage provided with slideways, a gun-transport vehicle having a rear carriage supported on the trail of the gun carriage and provided with a gun-receiving frame having slideways, a front carriage in ground engagement, a universal connection between said front and rear carriages, and means for transferring the gun from one carriage to another comprising a plurality of rail sections hinged together, one of said sections being supported on the slideways of the gun carriage in alinement with the same and another of said sections having a free end pivoted to the slideways on the transport-vehicle rear carriage.

7. In combination, a gun carriage provided with slideways, a gun-transport vehicle having a rear carriage supported on the trail of the gun carriage and provided with a gun-receiving frame having slideways, a front carriage, connections between the rear carriage and the front carriage providing for swinging movement of said carriages about transverse and longitudinal axes, said connections including a member rotatably mounted on the axle of the front carriage and slidable longitudinally of the same whereby the gun-receiving frame may be brought into alinement with the gun slide, and means for transferring the gun from one carriage to another comprising a pair of rail sections hinged together and having their free ends connected with said slideways.

8. In combination, a gun carriage provided with slideways, a gun transport vehicle having a rear carriage supported on the trail of the gun carriage and provided with a gun-receiving frame having slideways, a front carriage, connections between the rear carriage and the front carriage providing for relative swinging movement of the two about longitudinal and transverse axes, and adjustable means for transferring the gun from one carriage to another comprising a pair of rail sections hinged together, the free end of one section having a pin and slot connection with the slideways of the gun carriage, the free end of the other rail section having a vertical pivotal connection with the slideways of said gun-receiving frame.

9. In combination, a gun carriage provided with slideways, a gun-transport vehicle comprising a rear carriage supported on the trail of the gun carriage and provided with a gun-receiving frame having slideways, and a front carriage in ground engagement, means connecting said front and rear carriages providing for relative sliding transverse movement therebetween and elevation of the rear carriage to its position of support on the gun trail, means connected with the opposed ends of said slideways for transferring the gun from one carriage to another, a windlass member rotatably mounted in the axle of the transport-vehicle rear carriage, and means connected with the gun and said windlass member whereby the latter is adapted to control the movement of the gun during transfer of the same.

10. A gun-transport vehicle comprising a gun-receiving frame, a rear carriage on which said frame is mounted, a front carriage, and connections between said front and rear carriages providing for independent elevation of one of said carriages and sliding movement of the same transversely of the other carriage.

11. A gun-transport vehicle comprising a gun-receiving frame, a rear carriage on which said frame is mounted, a front carriage, and connections between said front and rear carriages providing for independent elevation of one of said carriages and sliding movement of the same transversely of the other carriage, said connections comprising a horizontal arm journalled on the gun-receiving frame and provided with a fork at one end thereof, and a sleeve rotatably mounted on the front carriage axle and movable longitudinally of the same, said fork being vertically pivoted on said sleeve.

12. A gun-transport vehicle comprising a gun-receiving frame, a rear carriage on which said frame is mounted, a front carriage, and connections between said front and rear carriages providing for independent elevation of one of said carriages and sliding movement of the same transversely of the other carriage, said connections including a sleeve rotatably and slidably mounted on the front carriage axle, and means for moving said sleeve longitudinally of the said axle.

13. In combination, a gun carriage and a gun-transport vehicle arranged in spaced relation, and means for transferring a gun from one to the other of said vehicles comprising a plurality of rail sections hinged together and supported by said vehicles.

14. A gun transport vehicle comprising a front carriage, a rear carriage, a body supported on said carriages and adapted to be alined with the cradle of a gun carriage, and means for controlling the movement of a gun during transfer of the same from one vehicle to the other, said means comprising a windlass housed in the axle of one of the transport vehicle carriages.

In testimony whereof I have signed this specification.

EUGÈNE SCHNEIDER.

Witnesses:
ANDRÉ MOSTICKER,
LOUIS GARDET.